(12) United States Patent
Hallett et al.

(10) Patent No.: US 10,260,989 B2
(45) Date of Patent: Apr. 16, 2019

(54) DEVICES, SYSTEMS, AND METHODS FOR CHECKING THE CONTINUITY OF AT LEAST ONE SPLICE WITHIN A FIBER OPTIC CONNECTOR

(71) Applicant: Corning Optical Communications LLC, Hickory, NC (US)

(72) Inventors: Bradley Evan Hallett, Watauga, TX (US); Daniel Leyva, Jr., Arlington, TX (US)

(73) Assignee: Corning Optical Communications LLC, Hickory, NC (US)

(*) Notice: Subject to any disclaimer, the term of this patent is extended or adjusted under 35 U.S.C. 154(b) by 51 days.

(21) Appl. No.: 15/683,918

(22) Filed: Aug. 23, 2017

(65) Prior Publication Data

US 2018/0058981 A1    Mar. 1, 2018

Related U.S. Application Data

(60) Provisional application No. 62/460,233, filed on Feb. 17, 2017, provisional application No. 62/379,840, filed on Aug. 26, 2016.

(51) Int. Cl.
*G02B 6/38* (2006.01)
*G02B 6/42* (2006.01)
(Continued)

(52) U.S. Cl.
CPC ........... *G01M 11/30* (2013.01); *G02B 6/2551* (2013.01); *G02B 6/3802* (2013.01);
(Continued)

(58) Field of Classification Search
CPC .. G01M 11/30; G01M 11/31; G01M 11/3109; G01M 11/3136; G01M 11/3154; G01M 11/3172; G01M 11/33; G01M 11/332; G01M 11/35; G01M 11/088; G02B 6/2551; G02B 6/2555; G02B 6/3802;
(Continued)

(56) References Cited

U.S. PATENT DOCUMENTS 3,843,132 A    10/1974  Ferguson
6,381,011 B1*  4/2002  Nickelsberg ....... G01M 11/3109
                                                      356/73.1
(Continued)

FOREIGN PATENT DOCUMENTS

DE    3309817 A1    9/1984
WO    2007078551 A2    7/2007

OTHER PUBLICATIONS

International Search Report and Written Opinion PCT/US2017/048799 dated Nov. 14, 2017.

*Primary Examiner* — Gordon J Stock, Jr.
(74) *Attorney, Agent, or Firm* — Adam R. Weeks (57) ABSTRACT

A system includes a plurality of different types of fiber optic connectors each having at least one stub optical fiber configured to be spliced to at least one cable optical fiber. The system also includes a tool configured to: a) receive and detect the different types of fiber optic connectors; and b) set a threshold value for an acceptable indication of continuity for at least one splice between the at least one stub optical fiber and the at least one cable optical fiber based on which type of the fiber optic connector is received and detected.

30 Claims, 8 Drawing Sheets

(51) Int. Cl.
*G01M 11/00* (2006.01)
*G02B 6/255* (2006.01)

(52) U.S. Cl.
CPC ......... *G02B 6/3821* (2013.01); *G02B 6/3893* (2013.01); *G02B 6/3898* (2013.01); *G02B 6/421* (2013.01); *G02B 6/4257* (2013.01); *G02B 6/3806* (2013.01); *G02B 6/3846* (2013.01)

(58) Field of Classification Search
CPC .. G02B 6/3806; G02B 6/3807; G02B 6/3821; G02B 6/3846; G02B 6/385; G02B 6/3893; G02B 6/3898; G02B 6/421; G02B 6/4219; G02B 6/422; G02B 6/42; G02B 6/21; G02B 6/4222; G02B 6/4225; G02B 6/4226; G02B 6/4227; G02B 6/4233; G02B 6/4234; G02B 6/4257

USPC ....................................................... 356/73.1
See application file for complete search history.

(56) References Cited

U.S. PATENT DOCUMENTS

| | | | |
|---|---|---|---|
| 7,329,049 B2* | 2/2008 | Meek ................... | G02B 6/3801 385/134 |
| 8,094,988 B2* | 1/2012 | Billman ............... | G02B 6/3802 385/134 |
| 9,618,707 B2 | 4/2017 | Leyva, Jr. et al. | |
| 2015/0063756 A1 | 3/2015 | Hallett et al. | |
| 2015/0063757 A1 | 3/2015 | Leyva, Jr. et al. | |
| 2015/0063761 A1 | 3/2015 | Hallett et al. | |
| 2016/0133005 A1 | 5/2016 | Pimpinella et al. | |
| 2018/0040117 A1* | 2/2018 | Castro ................... | G06K 9/4661 |
| 2018/0100812 A1* | 4/2018 | Akazawa ............... | G01M 11/35 |

* cited by examiner

DEVICES, SYSTEMS, AND METHODS FOR CHECKING THE CONTINUITY OF AT LEAST ONE SPLICE WITHIN A FIBER OPTIC CONNECTOR

CROSS-REFERENCE TO RELATED APPLICATIONS

This application claims the benefit of priority under 35 U.S.C § 119 of U.S. Provisional Application No. 62/379,840, filed on Aug. 26, 2016, and U.S. Provisional Application No. 62/460,233, filed on Feb. 17, 2017, the content of both applications being relied upon and incorporated herein by reference in its entirety.

BACKGROUND

The disclosure relates generally to optical fiber connectivity, and more particularly to devices, systems, and methods for checking the continuity of at least one splice within a fiber optic connector.

Optical fibers are useful in a wide variety of applications, including the telecommunications industry for voice, video, and data transmission. Due at least in part to extremely wide bandwidth and low noise operation provided by optical fibers, the variety of applications in which optical fibers are being used is continuing to increase. For example, optical fibers no longer serve merely as a medium for long distance signal transmission, but are being increasingly routed directly to the home and, in some instances, directly to a desk or other work location.

In a system that uses optical fibers, there are typically many locations where one or more optical fibers are optically coupled to one or more other optical fibers. This is often achieved by terminating the optical fibers with fiber optic connectors, which may ultimately be mated to perform the optical coupling. Terminating optical fibers in the field ("field termination") provides on-site flexibility both during initial installation and during any reconfiguring of the system, thereby optimizing management of cables that include the optical fibers.

Various fiber optic connectors have been developed to facilitate field termination. One example is the UniCam® family of field-installable fiber optic connectors available from Corning Optical Communications LLC of Hickory, N.C. UniCam® fiber optic connectors include a number of common features, including a mechanical splice between at least one preterminated fiber stub ("stub optical fiber") and at least one optical fiber from the field ("field optical fiber"). UniCam® fiber optic connectors are available or have been previously available for several different types of connectors, including SC, ST, LC, MTP®, and MTRJ fiber optic connectors.

When installing a field-installable connector, and specifically those involving a mechanical or fusion splice, it can be desirable to verify if an acceptable splice has been established. Such verification may be done during or after the termination process. For example, some installation tools incorporate features to check the continuity of splices that have been completed using the tools. The installation tools offered by Corning Optical Communications LLC for the UNICAM® fiber optic connectors incorporate such a feature. Alternatively, the continuity of splices within fiber optic connectors may be checked using separate tools. In either case, the continuity is often checked using a visual fault locator (VFL) that launches light into the front of a stub optical fiber so that the light travels through the stub optical fiber and reaches the location of the splice with the field optical fiber. Measuring the amount of light emanating from the splice location provides an indication of the continuity.

Some manufactures provide displays or other feedback mechanisms that inform users if there is an acceptable splice based on the amount of light measured during a continuity test. Such feedback mechanisms advantageously of reduce or eliminate subjectivity from users when performing the continuity test. However, it can be challenge to accurately measure light during the continuity test and provide reliable feedback.

SUMMARY

One embodiment of the disclosure relates to a device for checking the continuity of at least one splice between optical fibers within a fiber optic connector. There are different possible types of fiber optic connectors with the at least one splice. The device includes a plurality of different connector holders each respectively associated with one of the different types of fiber optic connectors. The device also includes a tool having a body and a printed circuit board coupled to the body. The body has a holding area configured to support the different connector holders. The printed circuit board is configured to detect which of the different connector holders is present in the holding area when one of the connector holders is supported by the holding area. The printed circuit board is also configured to set a threshold value for an acceptable indication of continuity based on which of the different connector holders is detected. The detection may occur automatically, such as by the different connector holders cooperating with the tool in a different manner, and the printed circuit board being configured to based its detection on the different manners of cooperation. Alternatively, the detection may occur manually, such as by way of user input into a user interface that communicates with the printed circuit board.

Other embodiments of devices for checking the continuity of at least one splice between optical fibers within a fiber optic connector are provided in this disclosure, with there still being different possible types of fiber optic connectors with the at least one splice. According to another embodiment, a device includes a connector holder associated with one of the different types of fiber optic connectors. The device also includes a body having a holding area for supporting the connector holder, a printed circuit board coupled to the body, and a plurality of switches coupled to the printed circuit board. Each of the switches is capable of being actuated such that there are different possible actuation patterns. Additionally, the connector holder is configured to provide one of the different possible actuation patterns when supported by the holding area of the body. The printed circuit board is configured to set a threshold value for an acceptable indication of continuity based on the actuation pattern provided by the connector holder.

For some embodiments, the devices may be considered as a kit or toolkit in that the different connector holders are included with the tool. This disclosure, however, also supports claims directed to tools themselves (e.g., without connector holders). As an example, one embodiment of a device for checking the continuity of at least one splice between optical fibers within a fiber optic connector, wherein there are different possible types of fiber optic connectors with the at least one splice, comprises a body having a holding area configured to support the different possible types of fiber optic connectors. The tool also comprises a printed circuit board coupled to the body. The printed circuit board is configured to detect which of the different types of fiber optic connectors is present in the holding area when one of the fiber optic connectors is supported in the holding area. The printed circuit board is also configured to set a threshold value for an acceptable indication of continuity based on which of the different types of fiber optic connectors is detected.

As another example, one embodiment of a device for checking the continuity of at least one splice between optical fibers within a fiber optic connector, wherein there are different possible types of fiber optic connectors with the at least one splice, comprises: a body having a holding area configured to support the different possible types of fiber optic connectors; a printed circuit board coupled to the body; a plurality of switches coupled to the printed circuit board; and a plurality of pins communicating with the holding area. Each of the pins is configured to be depressed in the holding area to actuate a corresponding one of the switches. Additionally, the printed circuit board is configured to set a threshold value for an acceptable indication of continuity based on which of the switches are actuated.

This disclosure also supports the devices being considered as part of a system that also includes the plurality of different types of fiber optic connectors, each of which may include at least one stub optical fiber configured to be spliced to at least one cable optical fiber (e.g., a "field fiber"). Additionally, in some embodiments, the tool in the system may be configured to install each of the different types of fiber optic connectors on the at least one cable fiber when the corresponding connector holder is supported by the holding area of the body. In other words, some of the devices, systems, and methods disclosed may be associated with an installation tool for terminating the at least one cable fiber with one of the fiber optic connectors. In other embodiments, however, the devices, systems, and methods may be associated with other tools, such as stand-alone test equipment for checking the continuity of at least one optical coupling.

According to another embodiment of this disclosure, a system for checking the continuity in a fiber optic connector comprises a plurality of different types of fiber optic connectors each including at least one stub optical fiber configured to be spliced to at least one cable optical fiber. The system also comprises a tool configured to: a) receive and detect the different types of fiber optic connectors; and b) set a threshold value for an acceptable indication of continuity for at least one splice between the at least one stub optical fiber and the at least one cable optical fiber based on which type of the fiber optic connector is received and detected.

According to another embodiment of this disclosure, a system for checking the continuity in a fiber optic connector comprises a plurality of different types of fiber optic connectors each including at least one stub optical fiber configured to be spliced to at least one cable optical fiber. The system also comprises a tool configured to receive the different types of fiber optic connectors. The tool includes means for detecting which of the different types of fiber optic connectors is present when one of the fiber optic connectors is loaded into the tool. The tool also includes means for setting a threshold value for an acceptable indication of continuity for at least one splice between the at least one stub optical fiber and the at least one cable optical fiber.

According to another embodiment of this disclosure, a method for checking continuity of at least one splice between at least two optical fibers within a fiber optic connector comprises loading the fiber optic connector into a tool. The tool includes a printed circuit board that detects the type of fiber optic connector loaded into the tool and sets a threshold value for an acceptable indication of continuity based on the type of fiber optic connector detected. The method also comprises delivering light energy from an optical power generator to the fiber optic connector loaded into the tool. A portion of the light energy delivered to the fiber optic connector emanates from the at least one splice. The method further involves causing the tool to measure the light energy emanating from the at least one splice. The printed circuit board compares measured values of the light energy to the threshold value to determine if the continuity is acceptable.

In methods like the one mentioned in the preceding paragraph, loading the fiber optic connector into the tool may involve positioning the fiber optic connector in a connector holder, wherein the connector holder is selected from a plurality of different types of connector holders each associated with a different type of fiber optic connector. The loading may also involve supporting the connector holder in a holding area of a body of the tool, wherein the connector holder cooperates with the tool in a different manner than the other types of connector holders. If desired, the tool may be designed so that the printed circuit board automatically detects which of the different types of fiber optic connectors is loaded into the tool based on how the connector holder cooperates with the tool. An alternative approach to loading the fiber optic connector into the tool may involve inputting into a user interface of the tool the type of fiber optic connector that is loaded into the tool, wherein the user interface communicates with the printed circuit board so that the printed circuit board detects which of the different types of fiber optic connectors is loaded into the tool.

Additional features and advantages will be set out in the detailed description which follows, and in part will be readily apparent to those skilled in optical connectivity. Indeed, it is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments. Persons skilled in the optical connectivity will appreciate how features and attributes associated with embodiments shown in one of the drawings may be applied to embodiments shown in other drawings.

DETAILED DESCRIPTION

Figure 1A:
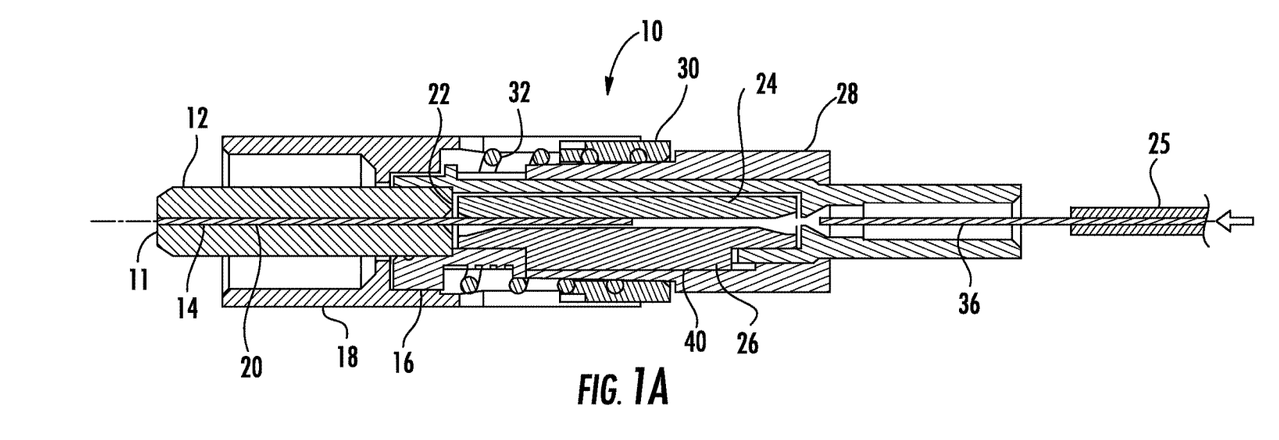
FIG. 1A is a lengthwise cross-sectional view of one example of a fiber optic connector being mounted on a field optical fiber by inserting the field optical fiber through a back end of the fiber optic connector.
Figure 1B:
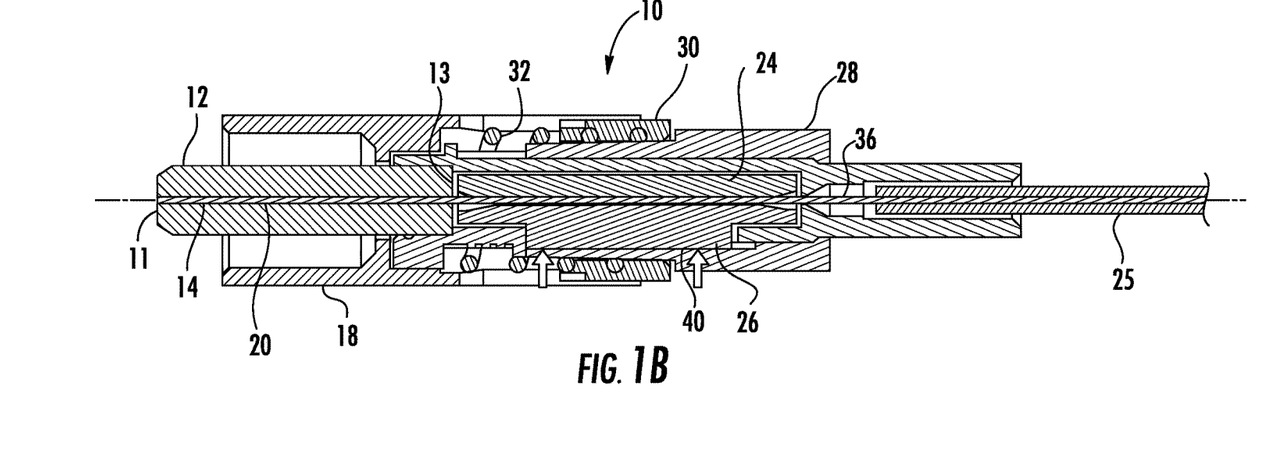
FIG. 1B is a lengthwise cross-sectional view similar to FIG. 1A, but showing the field optical fiber mechanically spliced to a stub optical fiber within the fiber optic connector by means of splice components that have been moved to an actuated position by a cam member.

Various embodiments will be further clarified by examples in the description below. In general, the description relates to devices, systems, and methods for checking the continuity of at least one splice within a fiber optic connector. One example of a fiber optic connector 10 (also referred to as "optical connector 10", or simply "connector 10") is shown in FIGS. 1A and 1B. The connector 10 is shown in the form of an SC-type fiber optic connector belonging to the UNICAM® family of fiber optic connectors mentioned in the Background section above. Although the connector 10 will be described in detail to facilitate discussion, the devices, systems, and methods in this disclosure may be applicable to different connector designs. This includes LC, ST, and MPO-type connectors, for example, and other single-fiber or multi-fiber connector designs. The connectors may include one or more mechanical splices between optical fibers, similar to UNICAM® fiber optic connectors, or may include one or more fusion splices. Again, the connector 10 will be described below merely to facilitate discussion.

As shown in FIGS. 1A and 1B, the connector 10 includes a ferrule 12 received in a ferrule holder 16, which in turn is received in a connector housing or body 18. The ferrule 12 defines a lengthwise, longitudinal bore 20 for receiving a stub optical fiber 14 ("stub fiber 14"). The stub fiber 14 may be sized such that one end extends outwardly beyond a rear end 22 of the ferrule 12. The connector 10 also includes: a pair of opposed splice components 24, 26 within the ferrule holder 16; a cam member 28 received over a portion of the ferrule holder 16 that includes the splice components 24, 26; a spring retainer 30 attached or otherwise held in place relative to the connector housing 18; and a spring 32 for biasing the ferrule holder 16 forward relative to the spring retainer 30 and connector housing 18. At least one of the splice components 24, 26 defines a lengthwise, longitudinal groove for receiving and aligning the end portion of the stub fiber 14 and an end portion of a field optical fiber 36 ("field fiber 36") on which the connector 10 is to be mounted. An index-matching material (e.g., index-matching gel) may be provided within the groove(s) for reasons mentioned below.

To mount the connector 10, the end portion of the field fiber 36 is inserted through a lead-in tube (not shown in FIGS. 1A and 1B) and into the splice components 24, 26. By advancing the field fiber 36 into the groove(s) defined by the splice components 24, 26, the end portions of the stub fiber 14 and the field fiber 36 make physical contact and become optically coupled. The index-matching material (e.g., index-matching gel) provided within the groove(s) surrounds this optical coupling to help reduce losses in optical signals that are transmitted between the field fiber 36 and stub fiber 14.

The optical coupling may secured by actuating the cam member 28. When actuated (FIG. 1B), the cam member 28 engages a keel portion 40 of the lower splice component 26 to bias the splice components 24, 26 together. This results in the splice components 24, 26 helping maintain the stub fiber 14 and field fiber 36 in position to complete the mechanical splice between the stub fiber 14 and field fiber 36. Biasing the splice components 24, 26 together may also result in the stub fiber 14 and field fiber 36 becoming better aligned in the groove(s) defined by the splice components 24, 26, thereby improving the optical coupling.

Having described the connector 10 as an example, and particularly the splice between the stub fiber 14 and field fiber 36, devices, systems, and methods for checking continuity of the splice will now be explained. The devices, systems and methods are intended for situations where there are different possible types of fiber optic connectors. Additionally, the devices, systems, and methods may be used in the field or a factory. Thus, although element 36 is referred to as a "field optical fiber" in this description, the general term "cable optical fiber" (or simply "cable fiber") may be used instead.

Figure 2:
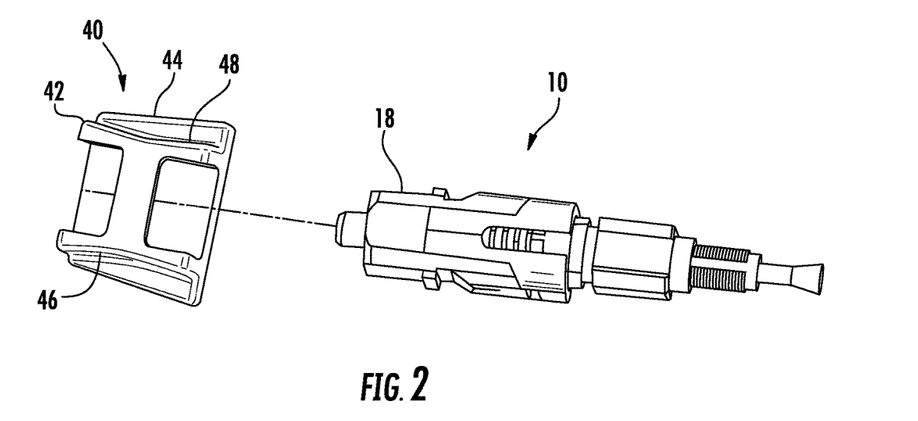
FIG. 2 is a perspective view of an example of a fiber optic connector and connector holder, wherein the fiber optic connector is removed from in the connector holder.

In general, there may be a plurality of different connector holders each respectively associated with one of the different types of fiber optic connectors. FIG. 2 illustrates an example of a connector holder 40 configured to be mounted on the connector 10. This step may be done by the manufacturer such that the connector holder 40 and the connector 10 are pre-assembled for end users. Alternatively, the connector holder 40 and connector 10 may be provided as separate components for an end user to assemble.

As shown in FIG. 2, the connector holder 40 includes a holding portion 42 extending from a base portion 44. The holding portion 42 defines a receptacle for receiving at least a portion of the connector housing 18. Although the holding portion 42 is shown as completely surrounding a portion of the connector housing 18, the holding portion 42 may alternatively define a U-shaped or otherwise open receptacle between first and second walls 46, 48 that define opposite sides of the holding portion 42. Any design that allows the connector holder 40 to be securely mounted onto the connector 10 (or, stated differently, that allows the connector 10 to be securely mounted onto the connector holder 40) will suffice. The secure mounting may be achieved by snap-fit between a portion of the connector holder 40 and a portion of the connector 10 (e.g., a latch arm 50 extending from the connector housing 18), an interference fit, complementary locking elements engaging each other, or the like.

Still referring to FIG. 2, the holding portion 42 of the connector holder 40 may have a width less than a width of the base portion 44. Such an arrangement provides the connector holder 40 with a pedestal-like configuration that may be easier for a user to grip and manipulate when loading the connector holder 40 and connector 10 into a tool (example tools are discussed below). The first and second walls 46, 48 being curved inwardly toward each other may improve ergonomics and further make the connector holder 40 easier to grip (e.g., between a user's thumb and finger). However, in other embodiments the first and second walls 46, 48 may not be curved or may be provided with a different configuration than what is shown in FIG. 2.

Figure 3:
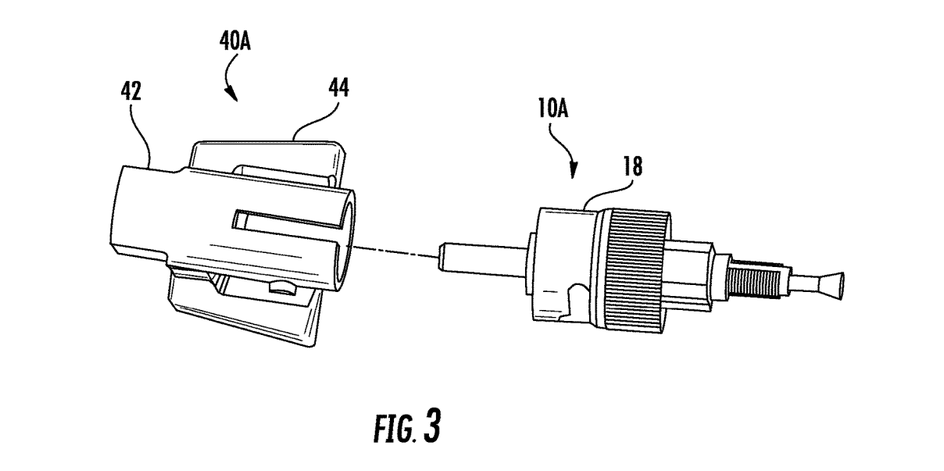
FIG. 3 is a perspective view similar to FIG. 2, but illustrates an example of a different connector holder for receiving a different type of fiber optic connector.
Figure 4:
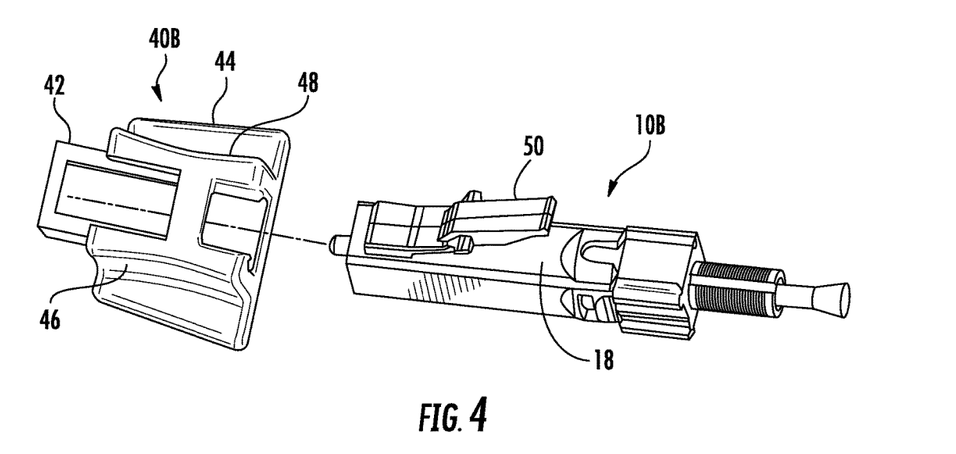
FIG. 4 is a perspective view similar to FIG. 2, but illustrates another example of a different connector holder for receiving a different type of fiber optic connector.
Figure 5:
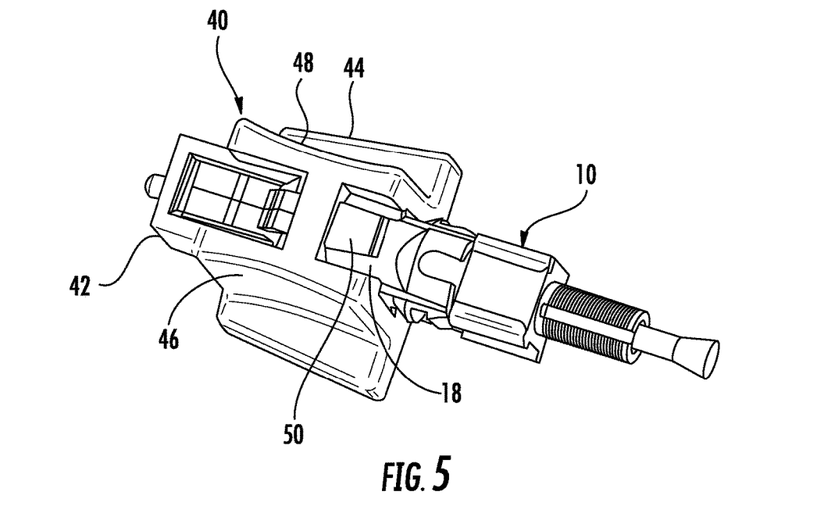
FIG. 5 is a perspective view the fiber optic connector and connector holder of FIG. 4, wherein the fiber optic connector is received in the connector holder.

FIGS. 2-4 illustrate how different connector holder designs may be provided for different types of connectors. Connector holders 40, 40A, 40B are shown for SC, ST, and LC-type connectors 10, 10A, 10B, respectively in FIGS. 2, 3, and 4, as examples. FIG. 5 illustrates the LC connector 10B securely mounted in the connector holder 40B (a latch arm 50 of the connector 10B engages the holding portion 42). The connector holders 40, 40A, 40B are uniquely configured to receive the respective connectors 10, 10A, 10B, and therefore, each have a different shape. Being uniquely shaped/configured is one way by which connector holders in this disclosure may each be associated with a different type of connector. Alternatively or additionally, connector holders according to this disclosure may different colors, indicia, or some other unique identification that associates the connector holders with a particular type of fiber optic connector. This may be the case, for example, when the different types of connectors include an angled physical contact (APC) or ultra physical contact (UPC) connectors having the same form-factor (e.g., SC-APC connectors vs. SC-UPC connectors).

As shown in FIGS. 2-5, the base portion 44 of each connector holder 40, 40A, 40B may have a similar shape/profile. The similarity allows the different connector holders 40, 40A, 40B (and, therefore, different types of connectors) to be received in and cooperate with the same holding area on a body of a tool. This can be better appreciated with reference to FIGS. 6 and 7, which illustrate the SC-type connector 10 and connector holder 40 being used in connection with a tool 60. The term "device" is used in this disclosure to collectively refer to the tool 60 and at least one connector holder. A device, therefore, may be the tool 60 provided with a single connector holder or each of the different connector holders (e.g., as a kit). The term "system" is used to collectively refer to the device and at least one of the different types of fiber optic connectors.

In the embodiment shown, the tool 60 is configured to: 1) install each of the different types of connectors on the field fiber 36; and 2) check the continuity of the splice that is completed between the stub fiber 14 and field fiber 36 during the connector installation. Integrating a continuity test system into a connector installation tool has several advantages. For example, users do not need to carry separate tools to perform each of the above-mentioned functions. Additionally, making the continuity test system part of the termination process helps ensure users actually check continuity, and do so at point in the termination process where corrective actions can still be taken if necessary (e.g., in the event of poor continuity).

Although both functions of the tool 60 will be described in further detail, in alternative embodiments there may be tools configured to perform only one of the above-mentioned functions. For example, the principles described below for checking continuity using the tool 60 may be incorporated into stand-alone tools not used to complete a splice within a connector.

With this in mind, the tool 60 includes a body 62 having a holding area 64 configured to support the different connector holders 40, 40A, 40B (FIGS. 2-5). Only the connector holder 40 will be referred to below because that is the example shown with the tool in FIG. 6, but the description applies equally to the connector holders 40A, 40B. The base portion 44 of the connector holder 40 and the holding area 64 of the tool 60 are shaped so that the holding area 64 only receives and cooperates with the base portion 44 when the connector holder 40 is in a desired orientation with respect to the tool 60. Stated differently, unless the connector holder 40 (and, therefore, the connectors 10) is oriented a desired way, the holding area 64 will not receive and cooperate with the base portion 44 to securely position the connector 10 with respect to the body 62.

There is only one desired orientation in the embodiment shown; one where the back end of the connector 10 extends into an actuation assembly 70 that is configured to actuate the cam member 28 (FIGS. 1A and 1B). Thus, unless the connector holder 40 is oriented in this particular way, the holding area 64 will not receive and cooperate with the base portion 44. Providing the base portion 44 with a shape that results in a bottom surface 72 (FIG. 9) of the connector holder 40 having a rotationally asymmetric profile, such as a trapezoid (as shown), and the connector holding area 64 with a complementary shape/profile, is one possible way of limiting the cooperation to a single orientation. The shapes and relationship, in effect, make the loading process for the connector 10 more intuitive and increases the likelihood of proper positioning for the termination process. Additional advantages may be obtained by providing the connector holder 40 and holding area 64 with the same or similar coloring or indicia, thereby making the loading process even more intuitive.

The actuation assembly 70 includes a caroming member 74 for actuating the cam member 28 of the connector 10 and thereby completing the splice between the stub fiber 14 and field fiber 36. In the particular embodiment shown, the caroming member 74 has a unique configuration and manner of movement that provides an "always open" pathway for loading and unloading the connector 10. These and other details relating to the actuation assembly 70 are fully described in U.S. Patent Application Pub. No. 2015/0063757, entitled "FIBER OPTIC CONNECTOR INSTALLATION TOOL." Other configurations for the actuation assembly 70 will be appreciated by persons skilled in optical connectivity, including configurations like those in other versions of UNICAM® installation tools previously or currently offered by Corning Optical Communications LLC.

Figure 6:
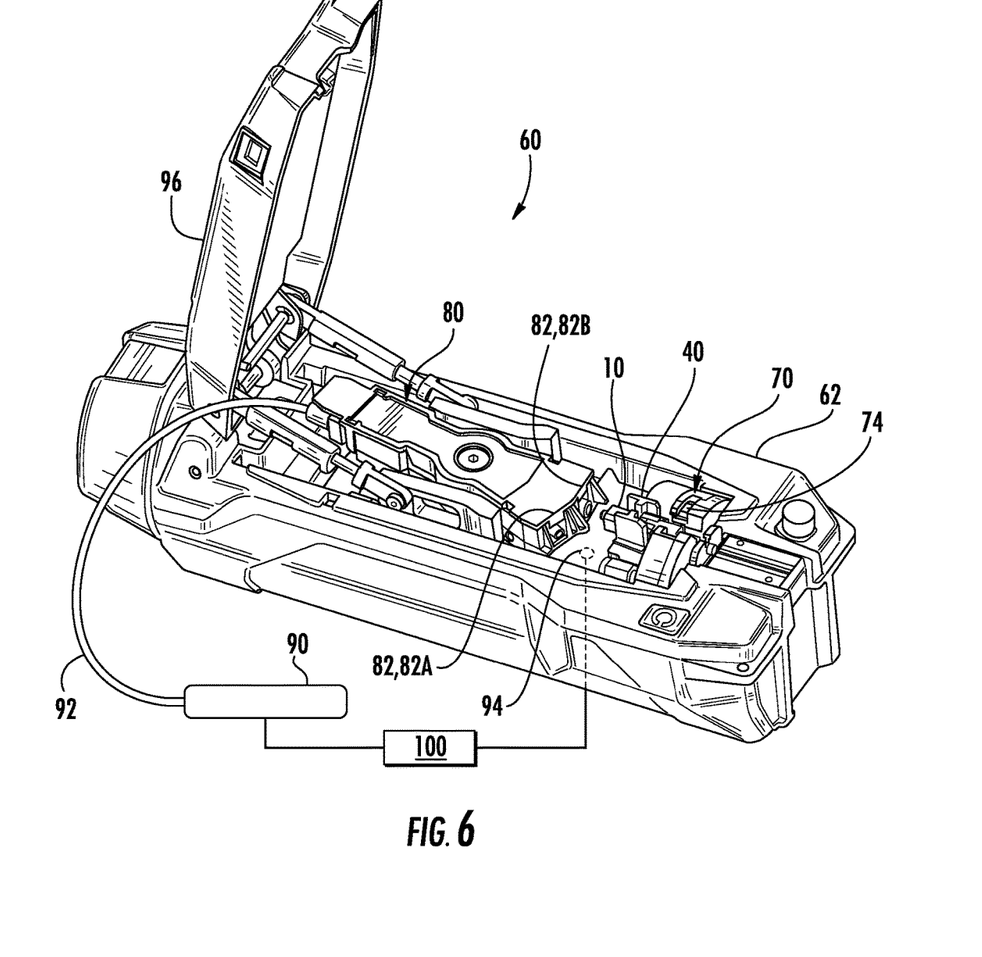
FIG. 6 is a perspective of one example of a tool for terminating an optical fiber with a fiber optic connector, wherein the fiber optic connector and connector holder of FIG. 2 are shown as being loaded into the tool.
Figure 7:
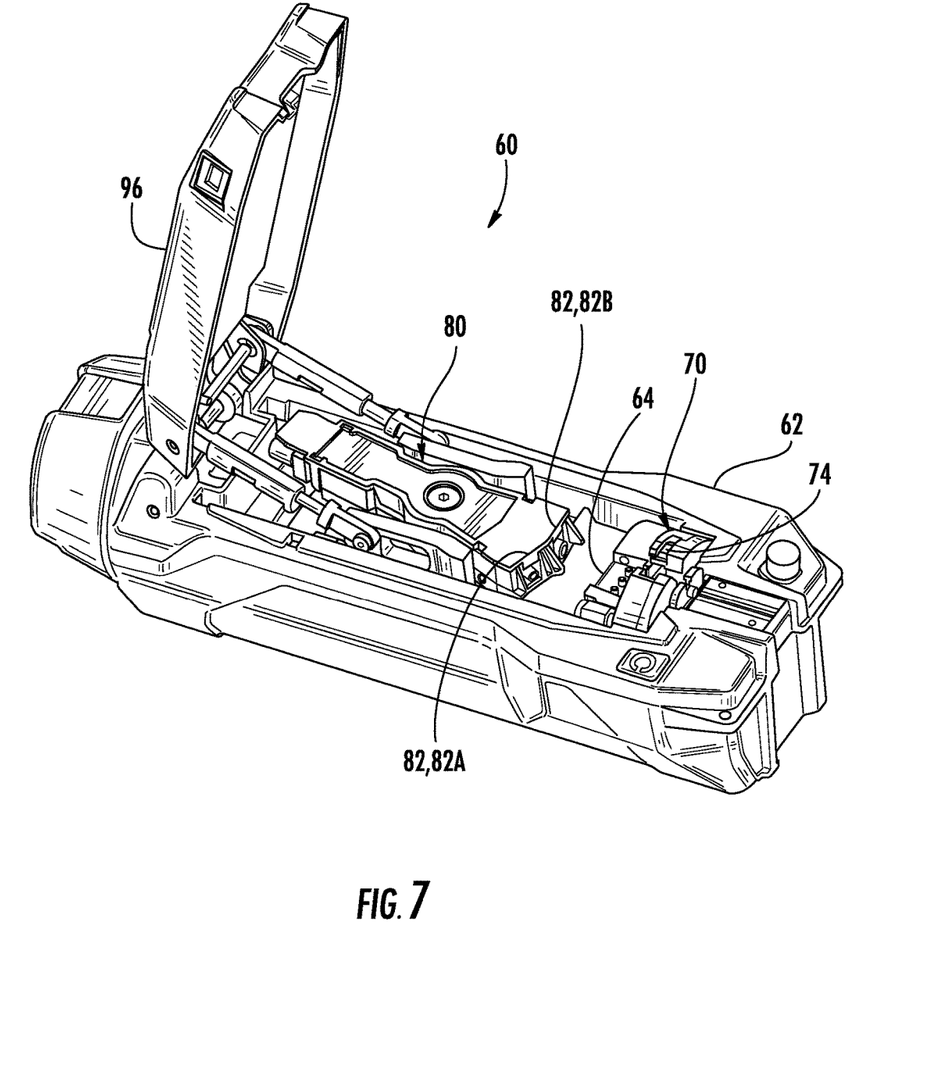
FIG. 7 is a perspective view of the tool of FIG. 6 without any fiber optic connector or connector holder loaded into the tool.

Still referring to FIG. 6, the tool 60 further includes an adapter 80 having different connector receiving areas 82 for interfacing with the different connector holders and connectors, such as those shown in FIGS. 2-5. First and second connector receiving areas 82A, 82B are defined by distinctly shaped connector receptacles on a front side of the adapter 80. The first connector receiving area 82A is configured to interface with the 1.25 mm diameter ferrule of LC connectors, while the second connector receiving area 84B is configured to interface with the 2.5 mm diameter ferrule of SC and ST connectors. The adapter 80 is movable relative to the body 62 to bring the appropriate connector receiving area 82 into alignment with the connector that has been loaded into the tool 60 (connector 10 in the embodiment shown). Once properly aligned, the adapter 80 can be moved toward the connector 10 to mate with or otherwise engage the connector 10. For additional details related to such a movable adapter, reference can be made to U.S. Patent Application Pub. No. 2015/0063761, entitled "TEST SYSTEM FOR CHECKING A SPLICE CONNECTION

BETWEEN A FIBER OPTIC CONNECTOR AND ONE OR MORE OPTICAL FIBERS."

As schematically shown in FIG. 6, the tool 60 in this example further includes an optical power generator 90 configured to deliver light energy to the connector 10. The optical power generator 90 may be, for example, a Helium Neon (HeNe) laser or the like. Although shown schematically next to the body 62, the optical power generator 90 may actually be housed within the body 62 and hidden from view. A delivery waveguide 92 (e.g., a fiber optic jumper cable) is coupled to the optical power generator 90 and configured to deliver the light energy to a back side of the adapter 80. Another delivery waveguide (not shown) may be housed within the adapter 80 to communicate the light energy from the delivery waveguide 92 to the connector 10.

The optical power generator 90 and delivery waveguide 92 in FIG. 6 form part of a test system for checking the continuity of the splice within the connector 10 between the stub fiber 14 and field fiber 36. Other types and arrangements of continuity test systems will be appreciated by persons skilled in optical connectivity. As mentioned above, the tool 60 is merely an example.

Figure 13:
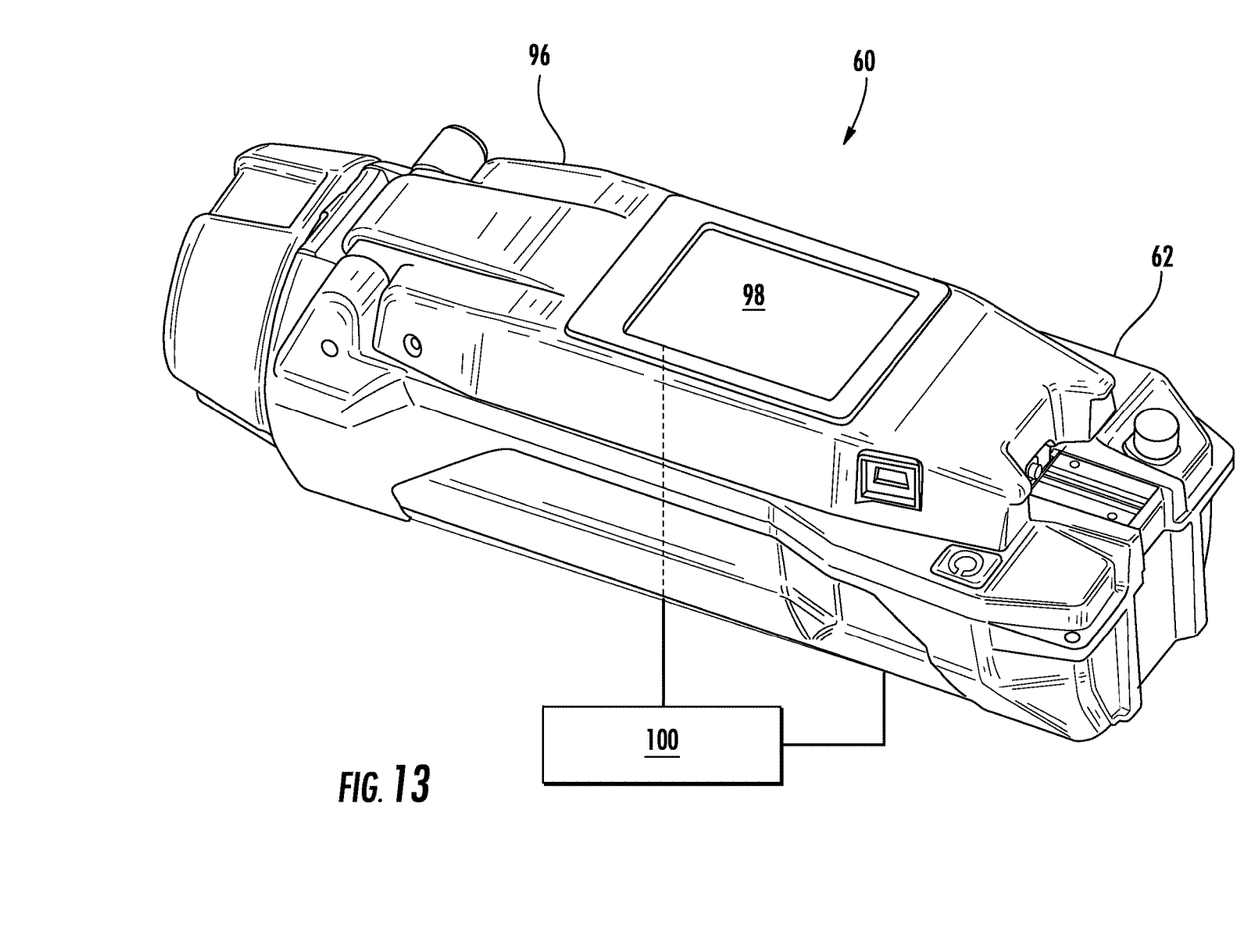
FIG. 13 is a perspective of the tool of FIG. 6, wherein a cover of the tool is shown in a closed position.

The light energy delivered by the optical power generator 90 may be visible light (e.g., red laser light). A portion of this light energy may escape/emanate from the splice within the connector 10 (see FIGS. 1A and 1B), thereby illuminating this area (referred to as the "termination area"). Thus, the termination area may produce a "glow" indicative of the amount of light from the stub fiber 14 being coupled into the field fiber 36. The splice components 24, 26, cam member 28, and/or other portions of the connector 10 are formed from a transparent or non-opaque (e.g., translucent) material so that the glow at the termination area can be monitored by at least one sensor 94 (e.g., a photo receptor; schematically shown in FIG. 6) in the body 62 of the tool 60. A cover 96 coupled to the body 62 is normally closed, as shown in FIG. 13, to isolate the connector 10 from ambient light. If the sensor 94 detects that the glow is below a predetermined threshold, continuity of the optical coupling between the field fiber 36 and stub fiber 14 is presumed to be established.

The result of the continuity test may be communicated to a user using a video display, one or more lights (e.g., LED's), or other feedback monitor. For example, the tool may include a video display 98 (FIG. 13) on a top side of the cover 96. The display 98 is coupled to a printed circuit board 100 that receives signals from the sensor 92 and compares measured values of the light emanating from the termination area to the predetermined threshold. Having the printed circuit board 100 and the feedback monitor has the advantage of avoiding user subjectivity. In other words, the end user does not need to assess whether the amount of light emanating from the termination area is substantial enough to indicate an acceptable splice. The printed circuit board 100 makes this assessment instead, and the feedback monitor communicates the outcome to the end user.

The predetermined threshold for an acceptable indication of continuity may be set based on experimental data. For example, a number of sample connectors 10 may be tested using the optical power generator 90 and sensor 94. Attenuation (i.e., loss) may also be tested using conventional tools, such as an optical time domain reflectometer (OTDR) or other optical power meter. The values measured by the sensor 94 may be analyzed with respect to the loss values measured for the connector 10 to determine an appropriate threshold for an acceptable indication of continuity.

An advantage associated with the tool 60 is that the printed circuit board 100 is configured to detect the type of connector (e.g., LC, SC, or ST) loaded into the tool 60. For example, in the particular embodiment shown, each of the different connector holders 40, 40A, 40B cooperates with the tool 60 in a different manner when supported by the holding area 64 of the body 62. Additional details related to this cooperation will be discussed below. In general, the printed circuit board 100 is configured to detect which of the different connector holders 40, 40A, 40B is present in the holding area 64 when one of the connector holders is supported by the holding area 64. Because each connector holder 40, 40A, 40B is associated with a particular type of connector, such detection effectively identifies the type of connector loaded into the tool 60. This information can then be used to improve the continuity test.

For example, although the different types of connectors (e.g., connectors 10, 10A, 10B) may each involve at least one splice, the components of the connectors have different shapes and/or arrangements. The different connector designs may affect how light emanating from the splice (or splices) is dispersed and ultimately measured by the sensor 94. Measured values for one type of connector may not necessarily provide the same indication of continuity as measured values for the other types of connectors. Accordingly, rather than setting a generic threshold value for an acceptable indication of continuity, the printed circuit board 100 may be configured to set different threshold values based on which type of connector is detected. The different threshold values may be predetermined as mentioned above (e.g., using experimental data that compares information from the sensor 94 and to measured loss values).

As can be appreciated, the ability to set different threshold values allows for more accurate continuity tests. The threshold values better correlate to loss values considered to be acceptable, and therefore, considered to indicate an acceptable splice.

Figure 8:
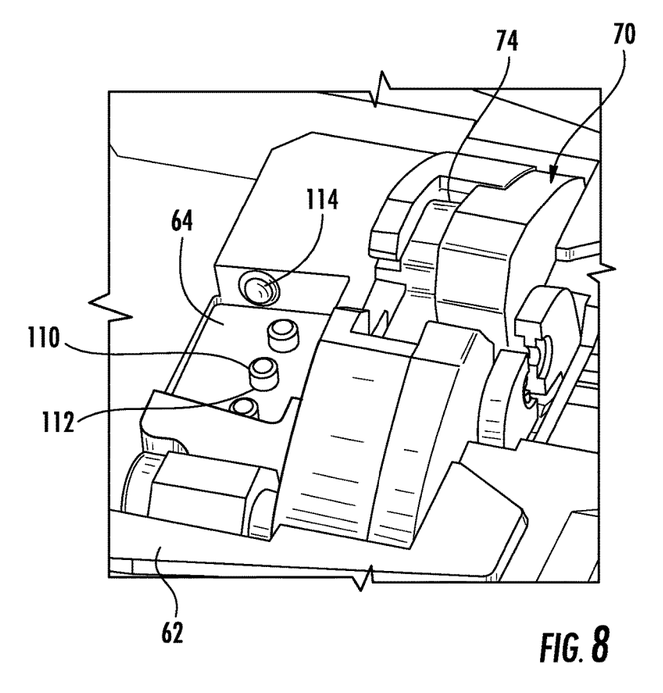
FIG. 8 is an enlarged perspective view of a portion of the tool shown in FIG. 7.

There are different ways in which the tool 60 may be configured to received and detect different types of connectors. The embodiment shown in FIGS. 6 and 7 will now be described in further detail as one example. To this end, FIG. 8 illustrates a portion of the tool 60 in further detail when the connector holder 40 and connector 10 are not present. The tool 60 includes a plurality of pins 110 communicating with the holding area 64. The pins 110 in this particular embodiment are received in holes 112 provided in the holding area 64. One or more retention features 114, such as a ball plunger, may also be provided adjacent or in the holding area 62 to help securely position the connector holder 40 when the connector holder 40 is supported by the holding area 62.

Figure 9:
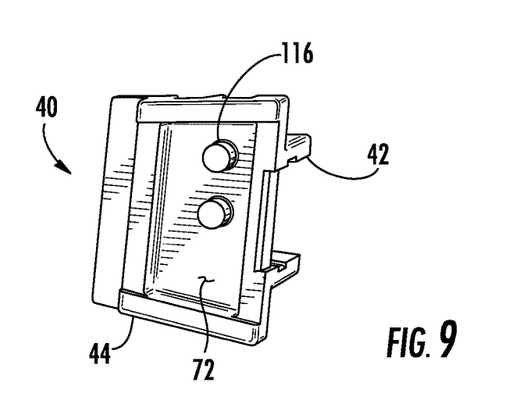
FIG. 9 is a perspective view of an example connector holder in an orientation that shows a bottom surface of the connector holder.
Figure 10:
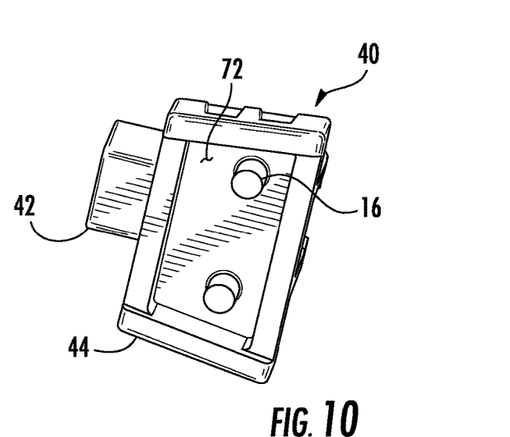
FIG. 10 is a perspective view similar to FIG. 9 but showing the bottom surface of another example connector holder.
Figure 11:
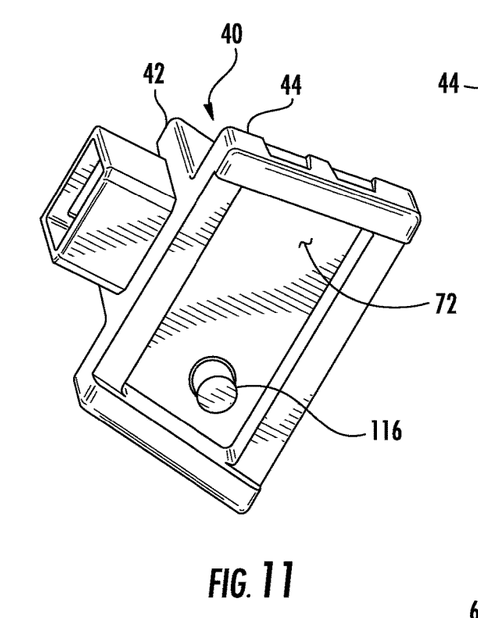
FIG. 11 is a perspective view similar to FIG. 9 but showing the bottom surface of yet another example connector holder.

FIGS. 9-11 respectively illustrate connector holders 40, 40B, and 40C as examples of different connector holders. The connector holder 40 in FIG. 9 is configured to receive the connector 10, as mentioned above. The connector holders 40B and 40C are each configured to receive LC fiber optic connectors, but are associated with APC or UPC versions of the LC form factor by way of a unique identification or the like (see discussion of FIGS. 2-5 above). For convenience, reference number 140 is also used to generically refer to the different connector holders 40, 40B, 40C (and may represent other connector holders that may be provided, such as the connector holder 40A in FIG. 3).

As shown in FIGS. 9-11, the bottom surfaces 72 of the different connector holders 140 each include a different arrangement of one or more projections 116. Each of the projections 116 is configured to depress one of the pins 110 when the associated connector holder 140 is supported by the holding area 64 of the body 62. In other words, when connectors are loaded into the tool 60 using the connector holders 140, the projection(s) 116 depress the corresponding pins 110. Each connector holder 140 depresses the pins 110 in a different manner due to the different arrangement of the projections 116. In alternative embodiments, the bottom surfaces 72 may include different arrangements of other geometric features (e.g., holes) instead of, or in addition to, the pins 110.

Figure 12:
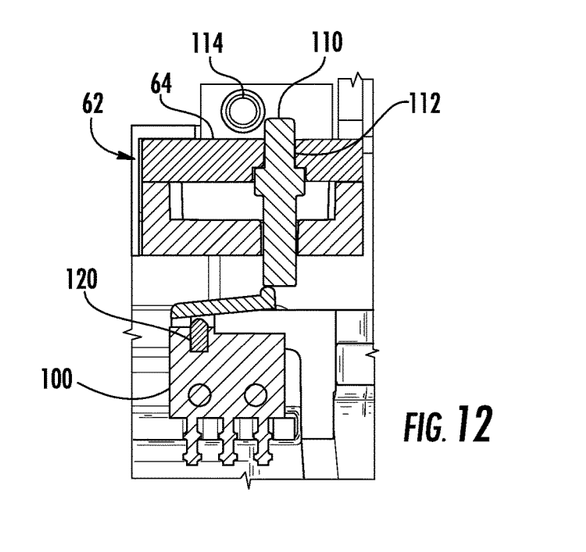
FIG. 12 is a cross-sectional view of a portion of the tool of FIGS. 6 and 7.

As shown in FIG. 12, each of the pins 110 is configured to actuate a corresponding switch 120 coupled to the printed circuit board 100. This means that the different connector holders 140 (e.g., FIGS. 9-11) will depress a different combination the pins 110 and actuate a different combination of the switches 120 when the connector holders 140 are supported by the holding area 62. The printed circuit board 100 associates the different combinations with the different types of connectors with which the connector holders 140 are associated so that the printed circuit board 100 can detect which type of connector is loaded into the tool 60.

There are three pins 110 provided in the embodiment shown. Whenever one of the bottom surfaces 72 of one of the connector holders 140 is supported by the holding area 64, each pin may or may not be depressed to actuate the corresponding switch 120; actuation depends on the arrangement of the projections 116 (or lack thereof). Thus, there are eight possible actuation patterns (two for each of the three pins, i.e. 2*2*2). In alternative embodiments, the tool 60 may have a different number of pins or otherwise be configured to provide a different number of actuation patterns. There should be at least as many actuation patterns for the number of different connector holders. This allows each of the different connector holders to be designed for providing a different one of the actuation patterns.

It will be apparent to those skilled in the art that further embodiments, modifications, and variations can be made without departing from the scope of the claims below. For example, although the printed circuit board 100 in the tool 60 is described above as automatically detecting which of the different connector holders 40, 40A, 40B is present in the tool 60 based on how the connector holder cooperates with the tool 60, in alternative embodiments the detection may occur in other ways. Some embodiments may even involve manual detection. As an example, the display 98 (FIG. 13) may be a touch-screen or the like to serve as a user interface. Thus, using the display 98, a user may input information about which type of fiber optic connector has been loaded into the tool 60 (and, therefore, is present in the holding area 64 of the body 62). The display 98 communicates with the printed circuit board 100 so that the printed circuit board 100 can detect which of the different types of fiber optic connectors (e.g., connectors 10, 10A, 10B) is present in the holding area 64 based on the input from the user. Other types of user interfaces may be provided instead of, or in addition to, the display 98 for these purposes. Additionally, in light of these variations, it will be appreciated that some embodiments need not involve different connector holders cooperating with the body 62 in different manners.

Since modifications, combinations, sub-combinations, and variations of the disclosed embodiments may occur to persons skilled in the art, the invention should be construed to include everything within the scope of the appended claims and their equivalents.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

What is claimed is:

1. A device for checking the continuity of at least one splice between optical fibers within a fiber optic connector, wherein there are different possible types of fiber optic connectors with the at least one splice, the device comprising:
a plurality of different connector holders each respectively associated with one of the different types of fiber optic connectors; and
a tool comprising:
a body having a holding area configured to support the different connector holders; and
a printed circuit board coupled to the body, wherein the printed circuit board is configured to:
detect which of the different connector holders is present in the holding area when one of the connector holders is supported by the holding area; and
set a threshold value for an acceptable indication of continuity based on which of the different connector holders is detected.

2. The device according to claim 1, further comprising:
an optical power generator for delivering light energy to one of the fiber optic connectors when the corresponding connector holder receives the fiber optic connector and is supported by the holding area of the body.

3. The device according to claim 2, wherein the optical power generator is housed within at least a portion of the body of the tool.

4. The device according to claim 1, wherein the tool further comprises:
a sensor coupled to the body and configured to detect the light energy delivered by the optical power generator, wherein the printed circuit board is configured to receive a signal from the sensor based on the amount of light detected and compare the signal to the threshold value to check the continuity of the at least one splice.

5. The device according to claim 1, wherein:
each of the connector holders cooperates with the tool in a different manner when supported by the holding area of the body; and
the printed circuit board is configured to automatically detect which of the different connector holders is present in the holding area based on how the connector holder cooperates with the tool when the connector holder is supported by the holding area of the body.

6. The device according to claim 1, wherein the tool further comprises:
a plurality of switches coupled to the printed circuit board, wherein the different connector holders actuate different combinations of the switches when supported by the holding area of the body.

7. The device according to claim 6, wherein the tool further comprises:
a plurality of pins communicating with the holding area, wherein each connector holder is configured to actuate at least one of the switches by depressing at least one of the pins when the connector holder is supported by the holding area of the body.

8. The device according to claim 7, wherein:
the body includes a plurality of holes in the holding area; and
each pin is received in a corresponding one of the holes.

9. The device according to claim 1 wherein:
each of the different connector holders includes a bottom surface with a different arrangement of one or more first geometric features.

10. The device according to claim 9, wherein the one or more first geometric features comprises at least one projection on the bottom surface of each of the connector holders.

11. The device according to claim 1, wherein the tool further comprises:
a user interface configured to receive input from a user about which type of fiber optic connector is present in the holding area, wherein the user interface communicates with the printed circuit board so that the printed circuit board can detect which of the different types of fiber optic connectors is present in the holding area based on the input from the user.

12. A device for checking the continuity of at least one splice between optical fibers within a fiber optic connector, wherein there are different possible types of fiber optic connectors with the at least one splice, the device comprising:
a connector holder associated with one of the different types of fiber optic connectors;
a body having a holding area for supporting the connector holder;
a printed circuit board coupled to the body; and
a plurality of switches coupled to the printed circuit board;
wherein:
each of the switches is capable of being actuated such that there are different possible actuation patterns;
the connector holder is configured to provide one of the different possible actuation patterns when supported by the holding area of the body; and
the printed circuit board is configured to set a threshold value for an acceptable indication of continuity based on the actuation pattern provided by the connector holder.

13. A device for checking the continuity of at least one splice between optical fibers within a fiber optic connector, wherein there are different possible types of fiber optic connectors with the at least one splice, the device comprising:
a body having a holding area configured to support the different possible types of fiber optic connectors;
a printed circuit board coupled to the body;
a plurality of switches coupled to the printed circuit board; and
a plurality of pins communicating with the holding area;
wherein:
each of the pins is configured to be depressed in the holding area to actuate a corresponding one of the switches; and
the printed circuit board is configured to set a threshold value for an acceptable indication of continuity based on which of the switches are actuated.

14. A device for checking the continuity of at least one splice between optical fibers within a fiber optic connector, wherein there are different possible types of fiber optic connectors with the at least one splice, the device comprising:
a body having a holding area configured to support the different possible types of fiber optic connectors; and
a printed circuit board coupled to the body, wherein the printed circuit board is configured to:
detect which of the different types of fiber optic connectors is present in the holding area when one of the fiber optic connectors is supported in the holding area; and
set a threshold value for an acceptable indication of continuity based on which of the different types of fiber optic connectors is detected.

15. The device according to claim 14, further comprising:
a user interface configured to receive input from a user about which type of fiber optic connector is present in the holding area, wherein the user interface communicates with the printed circuit board so that the printed circuit board can detect which of the different types of fiber optic connectors is present in the holding area based on the input from the user.

16. A system for checking continuity in a fiber optic connector, comprising:
a plurality of different types of fiber optic connectors each including, at least one stub optical fiber configured to be spliced to at least one cable optical fiber; and
a tool having a body and a printed circuit board coupled to the body, wherein the body includes a holding area configured to support the fiber optic connectors, and wherein the printed circuit board is configured to:
detect which of the different types of fiber optic connectors is present in the holding area when one of the fiber optic connectors is supported in the holding area; and
set a threshold value for an acceptable indication of continuity for at least one splice between the at least one stub optical fiber and the at least one cable optical fiber based on which of the different connector holders is detected.

17. The system according to claim 16, wherein the tool is configured to install each of the different types of fiber optic connectors on the at least one cable optical fiber.

18. The system according to claim 17, wherein:
each of the different types of the fiber optic connectors includes a cam member; and
the tool further comprises an actuation assembly configured to receive and actuate the cam member of each of the different types of fiber optic connectors to complete the at least one splice between the at least one stub optical fiber and the at least one cable optical fiber.

19. The system according to claim 16, wherein the tool is configured to complete the at least one splice between the at least one stub optical fiber and the at least one cable optical fiber.

20. The system according to claim 16, wherein the plurality of different types of fiber optic connectors comprises at least SC and LC-type fiber optic connectors.

21. The system according to claim 16, further comprising:
a plurality of different connector holders each respectively associated with one of the different types of fiber optic connectors, wherein the holding area of the body of the tool is configured to support the different connector holders.

22. The system according to claim 21, wherein:
each of the different types of fiber optic connectors includes a ferrule and a connector housing in which the ferrule is at least partially positioned; and
each connector holder is configured to receive at least a portion of the connector housing of the corresponding fiber optic connector, wherein each connector holder has a base portion that defines a bottom surface of the connector holder, and wherein the holding area of the body of the tool is configured to support the bottom surface of each connector holder.

23. The system according to claim 21, wherein:
   each of the connector holders cooperates with the tool in a different manner when supported by the holding area of the body; and
   the printed circuit board is configured to automatically detect which of the different types of fiber optic connectors is present in the holding area based on how the associated connector holder cooperates with the tool when the associated connector holder is supported by the holding area of the body.

24. The system according to claim 23, wherein the tool further comprises:
   a plurality of switches coupled to the printed circuit board, wherein the different connector holders actuate different combinations of the switches when supported by the holding area of the body.

25. The system according to claim 24, wherein the tool further comprises:
   a plurality of pins communicating with the holding area, wherein each connector holder is configured to actuate at least one of the switches by depressing at least one of the pins when the connector holder is supported by the holding area of the body.

26. The system according to claim 25, wherein:
   the body includes a plurality of holes in the holding area; and
   each pin is received in a corresponding one of the holes.

27. The system according to claim 16, wherein the tool further comprises:
   a user interface configured to receive input from a user about which type of fiber optic connector is present in the holding area, wherein the user interface communicates with the printed circuit board so that the printed circuit board can detect which of the different types of fiber optic connectors is present in the holding area based on the input from the user.

28. A system for checking the continuity in a fiber optic connector, comprising:
   a plurality of different types of fiber optic connectors each including at least one stub optical fiber configured to be spliced to at least one cable optical fiber; and
   a tool configured to:
      receive and detect the different types of fiber optic connectors; and
      set a threshold value for an acceptable indication of continuity for at least one splice between the at least one stub optical fiber and the at least one cable optical fiber based on which type of the fiber optic connector is received and detected.

29. The system according to claim 28, wherein the tool is configured to automatically detect which of the different types of fiber optic connectors is received in the tool.

30. The system according to claim 28, wherein the tool includes a user interface configured to receive input from a user, and wherein the tool is configured to detect the different types of fiber optic connectors based on the input from the user.

* * * * *

UNITED STATES PATENT AND TRADEMARK OFFICE
CERTIFICATE OF CORRECTION

PATENT NO. : 10,260,989 B2
APPLICATION NO. : 15/683918
DATED : April 16, 2019
INVENTOR(S) : Bradley Evan Hallett et al.

It is certified that error appears in the above-identified patent and that said Letters Patent is hereby corrected as shown below:

In the Claims

In Column 14, Line 19, Claim 16, delete "including," and insert -- including --, therefor.

Signed and Sealed this
Fourteenth Day of January, 2020

Andrei Iancu
*Director of the United States Patent and Trademark Office*